(12) United States Patent
Eby et al.

(10) Patent No.: US 11,386,481 B1
(45) Date of Patent: Jul. 12, 2022

(54) SYSTEMS AND METHODS FOR FACILITATING ENHANCED DEVICE FUNCTIONALITIES WITHIN A RETAIL STORE

(71) Applicant: WALGREEN CO., Deerfield, IL (US)

(72) Inventors: Nicholas L. Eby, Downers Grove, IL (US); Joseph M. Rago, Hinsdale, IL (US)

(73) Assignee: WALGREEN CO., Deerfield, IL (US)

( * ) Notice: Subject to any disclaimer, the term of this patent is extended or adjusted under 35 U.S.C. 154(b) by 714 days.

(21) Appl. No.: 16/248,275

(22) Filed: Jan. 15, 2019

Related U.S. Application Data

(63) Continuation of application No. 14/790,242, filed on Jul. 2, 2015, now Pat. No. 10,204,372.

(51) Int. Cl.
    *G06Q 30/06* (2012.01)
    *G06F 3/12* (2006.01)

(52) U.S. Cl.
    CPC ....... *G06Q 30/0635* (2013.01); *G06F 3/1239* (2013.01); *G06F 3/1272* (2013.01); *G06F 3/1287* (2013.01); *G06F 3/1288* (2013.01); *G06F 3/1292* (2013.01); *G06Q 30/0641* (2013.01)

(58) Field of Classification Search
    CPC ............ G06Q 30/0635; G06Q 30/0641; G06F 3/1292; G06F 3/1288; G06F 3/1272; G06F 3/1239; G06F 3/1287
    See application file for complete search history.

(56) References Cited

U.S. PATENT DOCUMENTS

| 8,095,631 B2 * | 1/2012 | Manico .............. H04N 1/00137 709/222 |
| 9,652,701 B2 * | 5/2017 | Asbury ................. G06F 3/1284 |
| 2003/0095785 A1 | 5/2003 | Izumi |
| 2005/0119945 A1 | 6/2005 | Van Luchene et al. |
| 2006/0290949 A1 * | 12/2006 | Nogawa ............. H04N 1/00408 358/1.1 |
| 2011/0231285 A1 | 9/2011 | Englund et al. |
| 2012/0191522 A1 * | 7/2012 | McLaughlin .......... G06Q 30/02 705/14.23 |

(Continued)

OTHER PUBLICATIONS

Imaging leaders MGI software and kodak team-up for online photo service. (Sep. 15, 1977). Business Wire Retrieved from https://dialog.proquest.com/professional/docview/1053932863?accountid=131444 (Year: 1997).*

(Continued)

*Primary Examiner* — Michael Misiaszek
(74) *Attorney, Agent, or Firm* — Marshall, Gerstein & Borun LLP; Randall G. Rueth

(57) ABSTRACT

Embodiments are provided for enhancing an in-store experience for a user of an electronic device. According to certain aspects, the electronic device initiates an in-store mode of an application when the electronic device is located within a retail store, where the in-store mode may enable certain functionalities having certain capabilities. The electronic device may detect when it connects to a network within the retail store and, in response, may indicate enhanced capabilities of the functionalities. The user may select an enhanced capability, and the electronic device may facilitate the associated functionality.

18 Claims, 14 Drawing Sheets

(56) References Cited

U.S. PATENT DOCUMENTS

| | | | |
|---|---|---|---|
| 2012/0296686 A1* | 11/2012 | Fugman | H04M 3/523 |
| | | | 705/7.19 |
| 2014/0268205 A1 | 9/2014 | DuBois | |
| 2014/0268230 A1* | 9/2014 | Kosuda | G06F 3/1203 |
| | | | 358/1.15 |
| 2015/0032532 A1 | 1/2015 | Narasimhan et al. | |
| 2015/0244807 A1* | 8/2015 | Shoemake | H04L 67/125 |
| | | | 709/202 |
| 2015/0324851 A1 | 11/2015 | Campbell et al. | |
| 2016/0253735 A1 | 9/2016 | Scudillo et al. | |
| 2018/0013916 A1 | 1/2018 | Koujimoto et al. | |

OTHER PUBLICATIONS

"Oki Data Corporation; Patent Issued for Image Formation Apparatus and Image Formation System Using the Same." Journal of Engineering ; Atlanta [Atlanta]May 21, 2014. (Year: 2014).

"Digital camera's prints from shop" Washington, Kevin . The Sun ; Baltimore, Md. [Baltimore, Md]Jan. 23, 2003: 10C. (Year: 2003).

"Camera phone digital printing stations" Anonymous. Drug Store News; Apr. 5, 2004; 26, 5; ProQuest Central p. 18 (Year: 2004).

"PhotoAccess Launches Retail and e-Tail Promotions to Reach Digital Photo Customers at the Point of Purchase; First Promotion Partners are Sears, Roebuck and Co. and d-store.conn" Business Editors &High-Tech Writers . Business Wire ; New York [New York]May 1, 2000 (Year: 2000).

\* cited by examiner

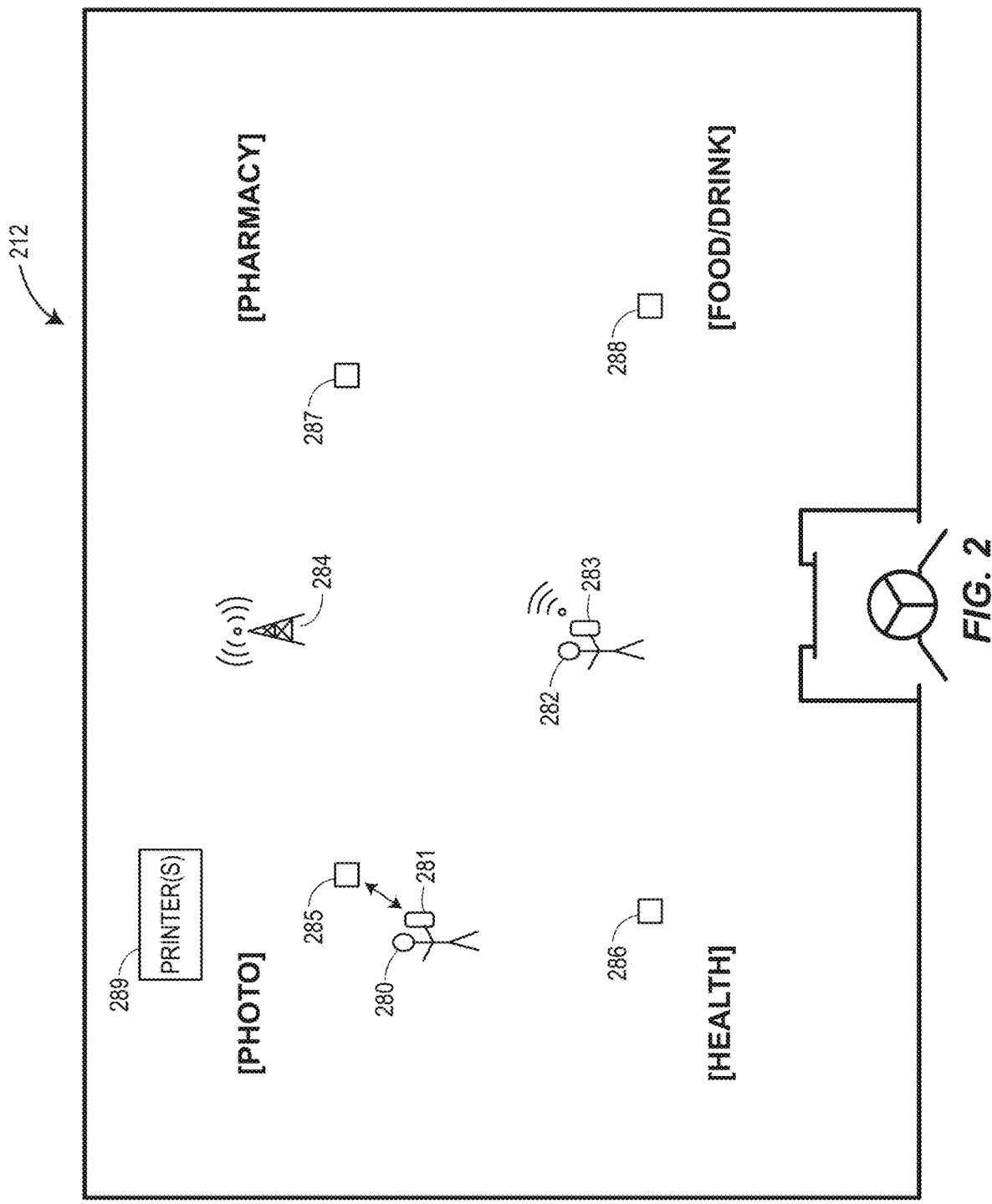

SYSTEMS AND METHODS FOR FACILITATING ENHANCED DEVICE FUNCTIONALITIES WITHIN A RETAIL STORE

CROSS-REFERENCE TO RELATED APPLICATIONS

This application is a continuation of U.S. patent application Ser. No. 14/790,242, filed Jul. 2, 2015, which is hereby incorporated by reference in its entirety.

FIELD

This application generally relates to enhancing an in-store retail experience for a customer. In particular, this application relates to leveraging network connections for various enhanced functionalities that may be facilitated by portable electronic devices.

BACKGROUND

Portable electronic devices such as smart phones and tablet devices are becoming more ubiquitous as underlying technology and device capability improves. These devices incorporate numerous components that support various device functions and applications. For example, current smart phones include imaging components that support digital image capture, where the smart phones are capable of storing numerous digital images.

Often, users desire to have a set of digital images printed. There are existing applications and platforms that enable users to initiate digital image printing directly from electronic devices. However, these applications and platforms have uniform capability regardless of the environment of the user or the electronic device itself. For example, an application may set the maximum amount of images that a user can print at ten (10), regardless of where the electronic device is located or to what type of network the electronic device is connected.

There is therefore an opportunity to offer an improved and enhanced experience for users to facilitate remote digital image printing from an electronic device. In particular, there is an opportunity to adjust remote image printing capability in certain situations in which users may benefit from the adjusted capability.

SUMMARY

In one embodiment, a computer-implemented method in an electronic device of enhancing an in-store experience within a retail store is provided. The method may include initiating, by a processor, an application associated with the retail store on the electronic device, displaying, via a user interface, an interface associated with an in-store mode of the application, the interface indicating a functionality having an initial capability, and detecting that the electronic device connects to a network associated with the retail store. The method may further include, modifying the interface to indicate an enhanced capability of the functionality in response to detecting that the electronic device connects to the network, receiving a selection of the functionality having the enhanced capability, and executing the functionality having the enhanced capability.

In another embodiment, an electronic device may be provided. The electronic device may include a communication module configured to connect to a network associated with a retail store, a user interface configured to display content, a memory storing a set of computer-executable instructions, and a processor interfacing with the communication module, the user interface, and the memory. The processor may be configured to execute the set of computer-executable instructions to cause the processor to initiate an application associated with the retail store, cause the user interface to display an interface associated with an in-store mode of the application, the interface indicating a functionality having an initial capability, detect that the electronic device connects, via the communication module, to the network associated with the retail store, and, in response to detecting that the electronic device connects to the network, cause the user interface to modify the interface to indicate an enhanced capability of the functionality. The processor may be further configured to receive, via the user interface, a selection of the functionality having the enhanced capability, and execute the functionality having the enhanced capability.

In a further embodiment, a computer-implemented method in an electronic device of facilitating printing of digital images in a retail store is provided. The method may include initiating, by a processor, an application associated with the retail store on the electronic device, displaying, via a user interface, an interface associated an in-store mode of the application, the interface indicating a functionality for printing digital images having an initial capability, and detecting that the electronic device connects to a network associated with the retail store. The method may further include modifying the interface to indicate an enhanced capability of the functionality for printing digital images in response to detecting that the electronic device connects to the network, receiving a selection of the functionality for printing digital images having the enhanced capability, generating a digital image print order indicating a set of digital images, and submitting, via the network, the digital image print order to a server associated with the retail store, the server configured to facilitate printing of the set of digital images according to the digital image print order.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

FIG. 2 depicts an exemplary layout of a retail and supported connections, in accordance with some embodiments.

DETAILED DESCRIPTION

Figure 1A:
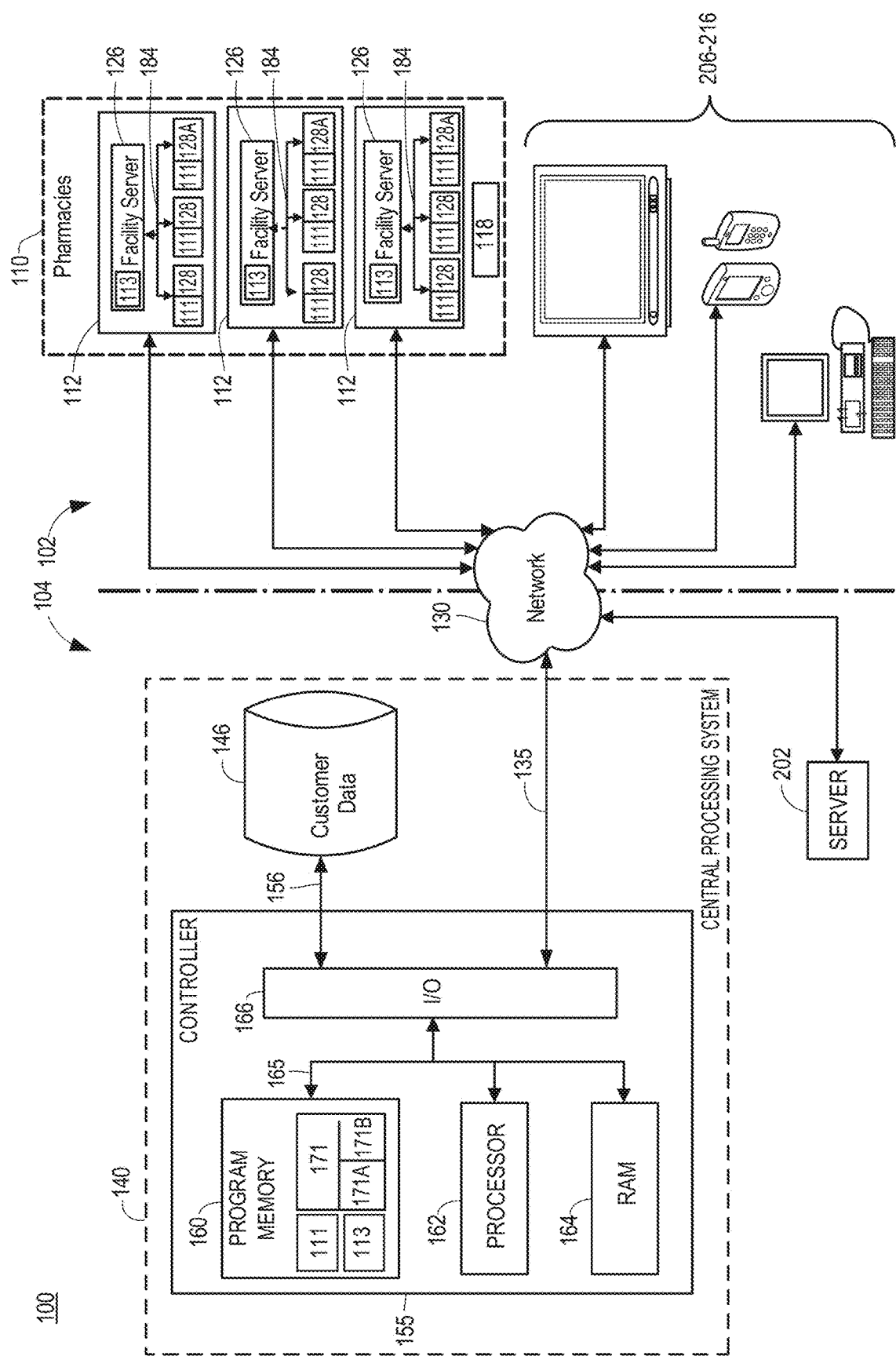
FIGS. 1A-1D illustrate various front end and back end devices and components, and connections therebetween, in accordance with some embodiments.

The systems and methods disclosed here relate generally to enabling enhanced features for users who are in a particular environment or setting. According to certain aspects, the environment or setting may be a retail store that offers various goods or services for sale. The enhanced features may therefore provide an improved in-store experience for users, where the enhanced features may increase certain abilities and efficiencies that may relate to in-store features or functionalities. An electronic device may be capable of facilitating the features and enabling a user to make various selections and control operation of the features.

According to embodiments, the electronic device may support a dedicated application that is associated with an entity (e.g., a retail store or a retail chain), where the application may offer various modes depending on a context of the user and/or the electronic device itself. In an implementation, the application may detect that it is located within a particular retail store and may accordingly initiate an "in-store" mode that enables the user to view certain information or facilitate certain functionalities that are adapted to be carried out within the retail store. For example, one of the functionalities may be to initiate a print order for digital images, where in-store printers may print the digital images for pickup by the users at the retail store.

The application may further enable enhanced or improved features within the in-store mode in response to the electronic device connecting to an in-store network (e.g., a wireless local area network (WLAN) of the retail store). Connection to the in-store network may afford the electronic device with an improved data transfer rate, increased transmission bandwidth, and/or other benefits of the connection. Accordingly, the enhanced or improved features may utilize the in-store network and realize the benefits thereof. For example, within the in-store mode, the user may be able to submit a print order for ten (10) digital images when the electronic device is not connected to the in-store network; however when the electronic device is connected to the in-store network, the user may be able to submit a print order for an increased amount of fifty (50) digital images. Of course, the application may reflect the enhanced or improved feature(s), such as within a user interface, in response to the electronic device connecting to the in-store network.

The embodiments as discussed herein therefore offer benefits to users of the electronic devices as well as to retailers. In particular, users are able to take advantage of the enhanced or improved features when in a certain environment or setting which caters to the enhanced or improved features, which generally improves in-store experiences for the users. Further, by offering the enhanced or improved features, retailers are able to build brand loyalty, increase customer retention, and generally increase in-store customer traffic and sales resulting therefrom. It should be appreciated that other advantages and benefits are envisioned.

The systems and methods discussed herein therefore address a challenge that is particular to electronic devices. In particular, the challenge relates to the general inability of electronic devices to be aware of their current environments or settings. In some situations, then, electronic devices are unable to offer certain improved functionalities that may be afforded by a particular network to which the electronic devices may connect. This is particularly apparent in functionalities which may result in improved experiences for users of the electronic devices. Instead of being limited by functionalities programmed within applications, the electronic devices of the present embodiments may detect certain network connections and dynamically enable enhanced or improved features that the network connections are capable of supporting. Further, as an example, the electronic devices have the capability to prioritize digital image print orders when the orders are placed when the electronic devices are connected to certain networks. Accordingly, the systems and methods are necessarily rooted in computer technology in order to overcome the noted shortcomings that specifically arise in the realm of electronic devices.

Similarly, the systems and methods provide improvements in a technical field, namely, e-commerce. Instead of the systems and methods merely being performed by hardware components using basic functions, the systems and methods employ complex steps that go beyond the mere concept of simply retrieving and combining data using a computer. In particular, the hardware components detect a current environment or setting as well as available network connections within that current environment or setting, dynamically increase the capabilities of certain e-commerce functionalities based on the network connections, and facilitate the e-commerce functionalities via the network connections. This combination of elements impose meaningful limits in that the operations are applied to improve e-commerce by enabling electronic device users to facilitate enhanced or improved e-commerce features that utilize current network capabilities in a meaningful and effective way.

FIG. 1A illustrates an overall system 100 including various components configured to implement the various embodiments. The system 100 may include a combination of hardware and software components, as well as various data communication channels for communicating data between and among the various hardware and software components. The system 100 may be roughly divided into front-end components 102 and back-end components 104. The front-end components 102 may be primarily disposed within a retail network 110 that may include one or more retail stores 112. The retail stores 112 may be located, by way of example rather than limitation, in separate geographic locations from each other, including different areas of the same city, different cities, or even different states. According to the present embodiments, each of the retail stores 112 may be a "brick and mortar" store that may include one or more physical buildings or structures, where each of the retail stores 112 may accommodate shoppers and customers. A brick and mortal store may be distinguished from an on-line store or website, or a mail-order store.

The front-end components 102 may include a number of workstations 128. The workstations 128 may be local computers located in the various retail stores 112 throughout the retail network 110 and may be capable of executing various applications, such as handing digital image print orders. Retail store personnel (not shown) may use the workstations 128 to access customer information, access images, and payment information, and/or other data.

The retail network 110 may also include one or more warehouses or central-printing facilities 118. The warehouses or central-printing facilities 118 may distribute image prints to the various retail stores 112 in the retail network 110, or may distribute image prints directly to customers. Internet-enabled devices (or client devices) 206-216 (e.g., personal computers, cellular phones, smart phones, internet-enabled televisions, etc.) may be communicatively connected to the retail stores 112 and to a system 140 through one or more digital networks 130, as described below.

Those of ordinary skill in the art will recognize that the front-end components 102 may also comprise a plurality of facility servers 126 disposed at the plurality of retail stores 112 instead of, or in addition to, a plurality of workstations 128. Each of the retail stores 112 may include one or more facility servers 126 that may facilitate communications between the workstations 128 of the retail stores 112 via the digital network(s) 130, and may store information for a plurality of customers/employees/accounts/etc. associated with each facility. Of course, a local digital network 184 may also operatively connect each of the workstations 128 to the facility server 126. Unless otherwise indicated, any discussion of the workstations 128 may also refer to the facility servers 126, and vice versa. Moreover, environments other than the retail stores 112 may employ the workstations 128 and the servers 126.

The front-end components 102 may communicate with the back-end components 104 via the digital network(s) 130. One or more of the front-end components 102 may be excluded from communication with the back-end components 104 by configuration or by limiting access due to security concerns. For example, the internet-enabled devices 206-216 may be excluded from direct access to the back-end components 104. In some embodiments, the retail stores 112 may communicate with the back-end components via the digital network(s) 130. In other embodiments, the retail stores 112 and the internet-enabled devices 206-216 may communicate with the back-end components 104 via the same digital network 130, but digital access rights, IP masking, and other network configurations may deny access to the internet-enabled devices 206-216.

The digital network(s) 130 may be a proprietary network, a secure public Internet, a virtual private network or some other type of network, such as dedicated access lines, plain ordinary telephone lines, satellite links, combinations of these, etc. Where the digital network 130 comprises the Internet, data communication may take place over the digital network 130 via an Internet communication protocol. In addition to one or more servers 202 (described below), the back-end components 104 may include the central processing system 140.

Of course, the retail stores 112 may be communicatively connected to different back-end components 104 having one or more functions or capabilities that are similar to the central processing system 140. The central processing system 140 may include one or more computer processors 162 adapted and configured to execute various software applications and components of the remote printing system 100, in addition to other software applications. The central processing system 140 may further include a database 146. The database 146 is adapted to store data related to the operation of the system 100 (e.g., customer profile data, past print purchases, images uploaded to the customer accounts, etc.) The central processing system 140 may access data stored in the database 146 when executing various functions and tasks associated with the operation of the remote printing system 100.

Although FIG. 1A depicts the remote printing system 100 as including the central processing system 140 in communication with three retail stores 112, and various internet-enabled devices 206-216 it should be understood that different numbers of processing systems, retail stores, and devices may be utilized. For example, the digital network(s) 130 (or other digital networks, not shown) may interconnect the central processing system 140 to a plurality of included central processing systems 140, hundreds of retail stores 112, and thousands of internet-enabled devices 206-216. According to the disclosed example, this configuration may provide several advantages, such as, for example, enabling near real-time uploads and downloads of information as well as periodic uploads and downloads of information. This may provide for a primary backup of all the information generated in supported functionalities. Alternatively, some of the retail stores 112 may store data locally on the facility server 126 and/or the workstations 128.

FIG. 1A also depicts one possible embodiment of the central processing system 140. The central processing system 140 may have a controller 155 operatively connected to the database 146 via a link 156 connected to an input/output (I/O) circuit 166. It should be noted that, while not shown, additional databases may be linked to the controller 155 in a known manner.

The controller 155 may include a program memory 160, the processor 162 (which may be called a microcontroller or a microprocessor), a random-access memory (RAM) 164, and the input/output (I/O) circuit 166, all of which may be interconnected via an address/data bus 165. It should be appreciated that although only one microprocessor 162 is shown, the controller 155 may include multiple microprocessors 162. Similarly, the memory of the controller 155 may include multiple RAMs 164 and multiple program memories 160. Although the I/O circuit 166 is shown as a single block, it should be appreciated that the I/O circuit 166 may include a number of different types of I/O circuits. The RAM(s) 164 and the program memories 160 may be implemented as semiconductor memories, magnetically readable memories, and/or optically readable memories, for example. A link 135 may operatively connect the controller 155 to the digital network 130 through the I/O circuit 166.

The program memory 160 may also contain machine-readable instructions (i.e., software) 171, for execution by the processor 162. The software 171 may perform the various tasks associated with operation of the retail store or retail stores, and may be a single module 171 or a plurality of modules 171A, 171B. While the software 171 is depicted in FIG. 1A as including two modules, 171A and 171B, the software 171 may include any number of modules accomplishing tasks related to retail store operation. The central processing system 140 may implement a server application 113 for providing data to a user interface application 111 operating on the workstations 128.

Figure 1B:
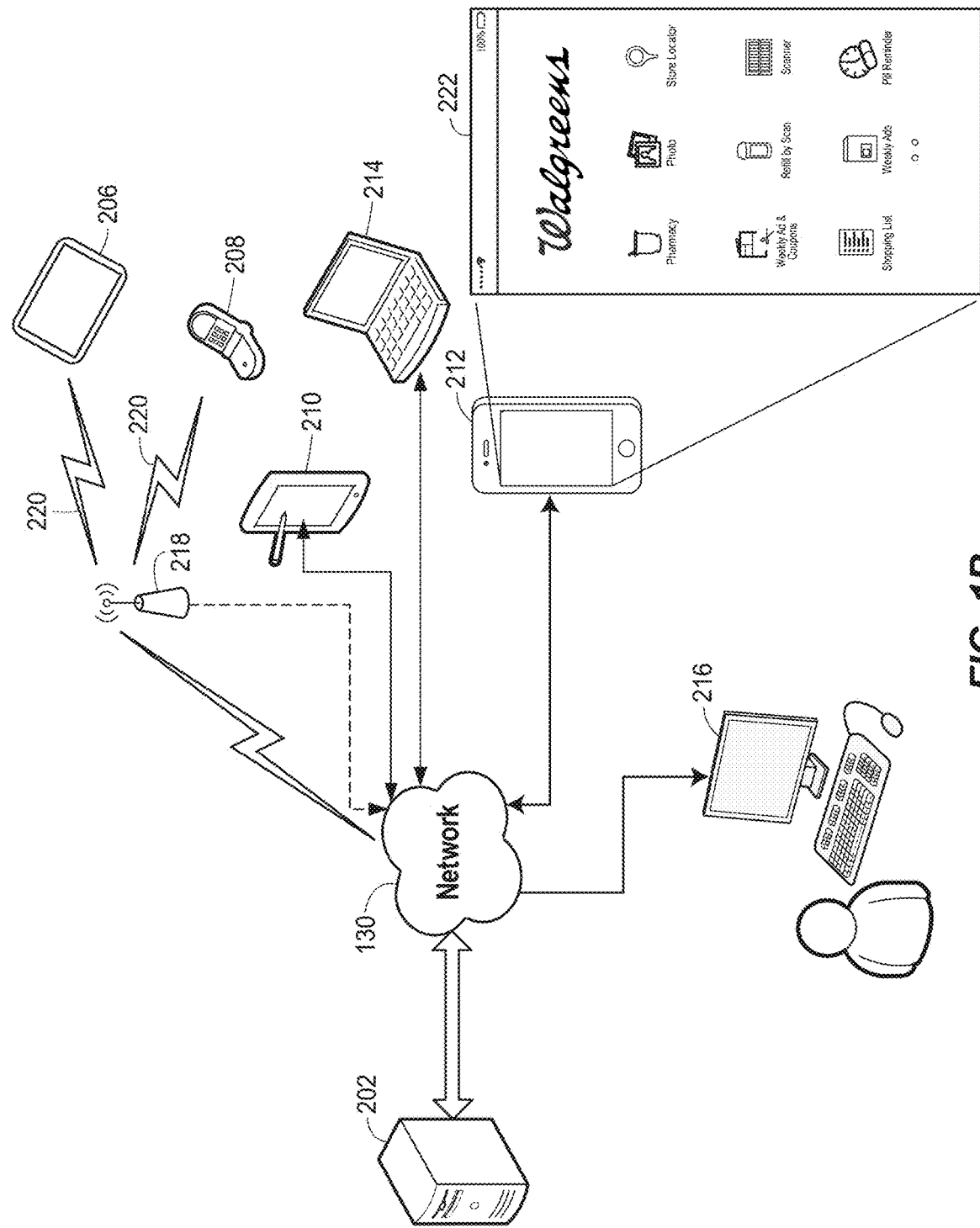

For purposes of implementing the system 100, a user may interact with the server 202 and the retail store systems (e.g., the central processing system 140) via one of the internet-enabled devices 206-216 (e.g., mobile device application, etc.), a specialized application, or a plurality of web pages. FIG. 1B depicts the server 202 connected via the network 130 to the internet-enabled devices 206-216 through which a user may initiate and interact with the system 100 (as shown in FIG. 1A). The internet-enabled devices (or generally, "electronic devices") 206-216 may include, by way of example, a tablet computer 206, an internet-enabled cell phone 208, a personal digital assistant (PDA) 210, a smart phone 212, a laptop computer 214, a desktop computer 216, a portable media player (not shown), and/or others. Of course, any internet-enabled device 206-216 appropriately configured may interact with the remote printing system 100.

The internet-enabled devices 206-216 need not necessarily communicate with the network 130 via a wired connection. In some instances, the internet-enabled devices 206-216 may communicate with the network 130 via wireless signals 220 and, in some instances, may communicate with the network 130 via an intervening wireless or wired device 218, which may be a wireless router, a wireless repeater, a base transceiver station of a mobile telephony provider, etc. Each of the internet-enabled devices 206-216 may interact with the server 202 to receive web pages or server data from the server 202 and may display the web pages or server data via a client application (described below). For example, the mobile device 212 may display a home screen 222 (i.e., the root or start page at which users enter the client application) of the client application to the user, may receive an input from the user, and may interact with the server 202 depending on the type of user-specified input. It will be appreciated that although only one server 202 is depicted in FIG. 1B, multiple servers 202 may be provided for the purpose of distributing server load, serving different web pages, implementing different portions of the retail store web interface, etc. These multiple servers 202 may include a web server, an entity-specific server (e.g. an Apple® server, etc.), a server that is disposed in a retail or proprietary network, an independent third-party server that is not under the control of the entity, or others.

Figure 1C:
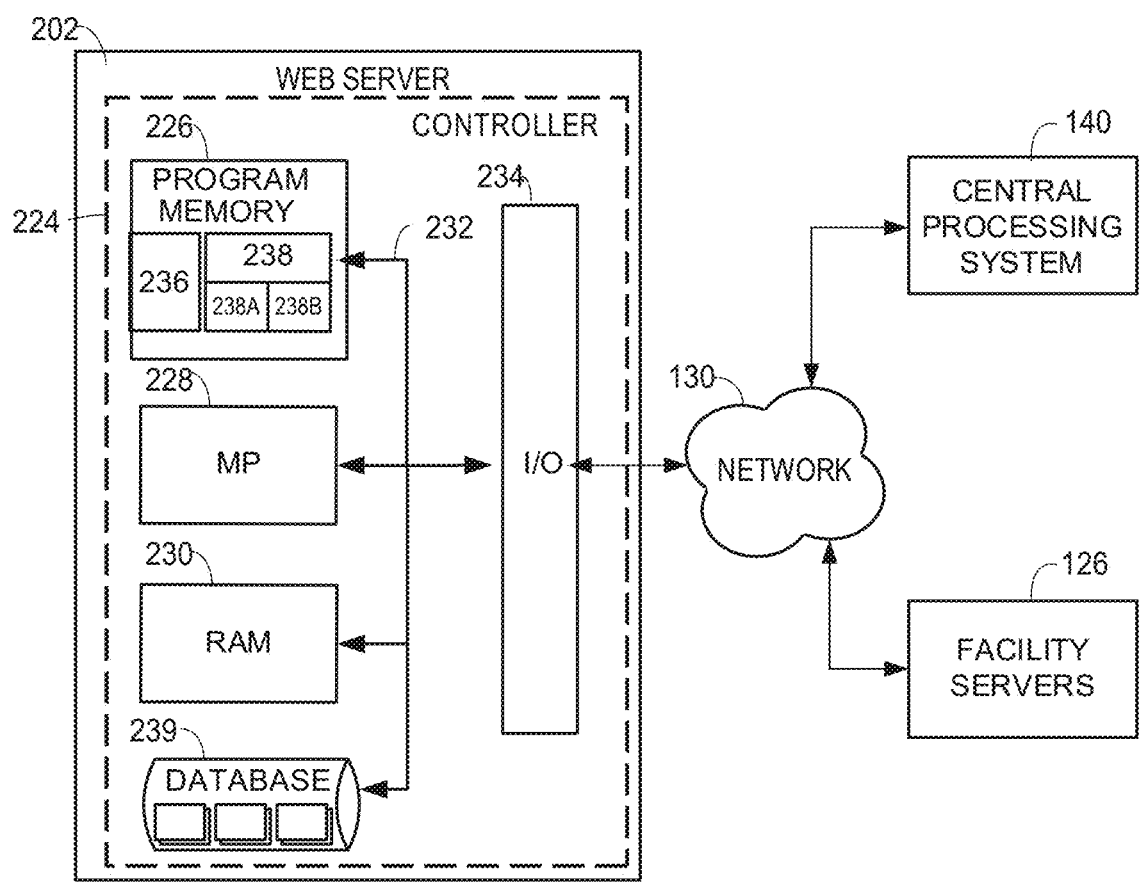

Turning now to FIG. 1C, the server 202, like the facility server 126, may include a controller 224. Similar to the controllers 155 and 170, the controller 224 may include a program memory 226, a microcontroller or a microprocessor (MP) 228, a random-access memory (RAM) 230, and an input/output (I/O) circuit 234, all of which may be interconnected via an address/data bus 232. In some embodiments, the controller 224 may also include, or otherwise be communicatively connected to, a database 239 or other data storage mechanism (e.g., one or more hard disk drives, optical storage drives, solid state storage devices, etc.). The database 239 may include data such as customer web profiles, product data, mobile device application data, web page templates and/or web pages, and other data that may be used to interact with the user through the network 130.

As discussed with reference to the controllers 155 and 170, it should be appreciated that although FIG. 1C depicts only one microprocessor 228, the controller 224 may include multiple microprocessors 228. Similarly, the memory of the controller 224 may include multiple RAMs 230 and multiple program memories 226. Although the FIG. 1C depicts the I/O circuit 234 as a single block, the I/O circuit 234 may include a number of different types of I/O circuits. The controller 224 may implement the RAM(s) 230 and the program memories 226 as semiconductor memories, magnetically readable memories, and/or optically readable memories, for example.

In addition to being connected through the network 130 to the internet-enabled devices 206-216, as depicted in FIG. 1B, FIG. 1C illustrates that the server 202 may also be connected through the network 130 to the central processing system 140 and/or one or more facility servers 126. As described below, the connection of the server 202 to the central processing system 140 may assist in facilitating various functionalities. As a result, the server 202 may act as a routing or interfacing server between the plurality of internet-enabled devices 206-216 and a destination server, namely, the central processing system 140. For example, the server 202 may be configured to communicate with the central processing system 140 and with the internet-enabled devices 206-216 via a multitude of protocols, such as packet-switched protocols, web services, web APIs (Application Programming Interface), etc. The server 202 may also convert (if necessary) and route client application data (not shown) to the appropriate server, such as the central process system 140 for example. Additionally, the server 202 may act as the destination server and need not route any data from the internet-enabled devices 206-216.

As shown in FIG. 1C, the program memory 226 and/or the RAM 230 may store various applications for execution by the microprocessor 228. For example, a user-interface application 236 may provide a user interface to the server 202, which user interface may, for example, enable a network administrator to configure, troubleshoot, or test various aspects of the server's operation, or otherwise to access information thereon. A server application 238 may operate to populate and transmit client application data and web pages to the internet-enabled devices 206-216, receive information from the user transmitted back to the server 202, and forward appropriate data to the central processing system 140 and the facility servers 126.

Like the software 171 of FIGS. 1A and 1B, the server application 238 may be a single module 238 or a plurality of modules 238A, 238B. While the server application 238 is depicted in FIG. 1C as including two modules, 238A and 238B, the server application 238 may include any number of modules that may facilitate tasks related to implantation of the server 202. By way of example, the module 238A may populate and transmit the client application data and/or may receive and evaluate inputs from the user to receive a data access request, while the module 238B may communicate with one or more of the back end components 104 to fulfill a data access request.

Figure 1D:
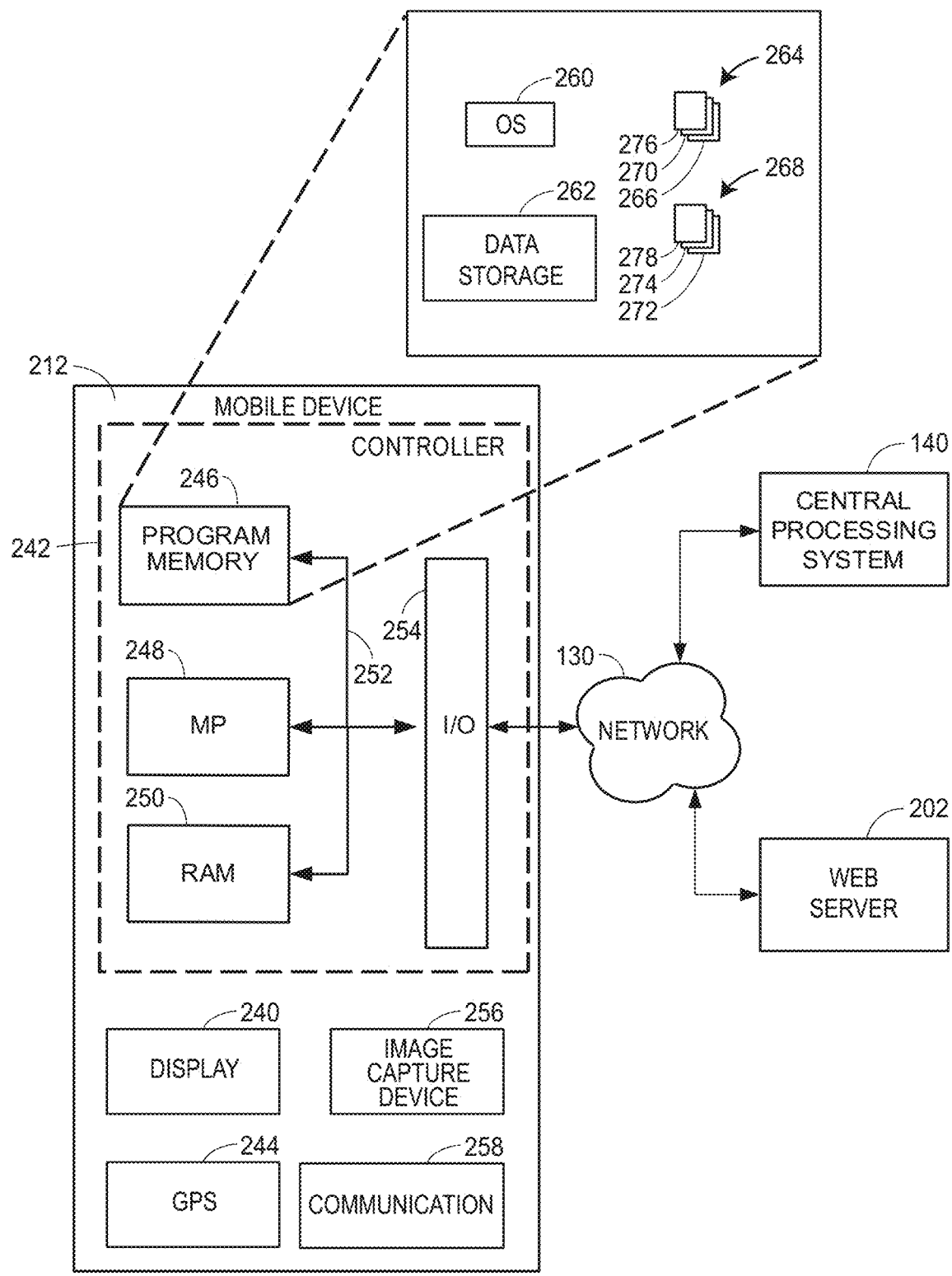

Referring now to FIG. 1D, the mobile device 212 (or any of the internet-enabled devices 206-216) may include a display 240, a Global Positioning System (GPS) unit 244, a communication unit 258, an image capture device 256, a user-input device (not shown), and, like the server 202, a controller 242. Similar to the controllers 155 and 224, the controller 242 includes a program memory 246, one or more microcontroller or a microprocessor (MP) 248, a random-access memory (RAM) 250, and an input/output (I/O) circuit 254, all of which may be interconnected via an address/data bus 252.

The program memory 246 may include an operating system 260, a data storage 262, a plurality of software applications 264, and a plurality of software routines 268. The operating system 260, for example, may include one of a plurality of mobile platforms such as the iOS®, Android™, Palm® webOS, Windows Mobile/Phone, Black-Berry® OS, or Symbian® OS mobile technology platforms, developed by Apple® Inc., Google® Inc., Palm® Inc. (now Hewlett-Packard Company®), Microsoft Corporation®, Research in Motion® (RIM), and Nokia®, respectively. The data storage 262 may include data such as user profiles, application data for the plurality of applications 264, routine data for the plurality of routines 268, and other data necessary to interact with the server 202, the facility servers 126, or the server applications 113 through the digital network 130. In some embodiments, the controller 242 may also include, or otherwise be communicatively connected to, other data storage mechanisms (e.g., one or more hard disk drives, optical storage drives, solid state storage devices, etc.) that may reside within the mobile device 212.

The GPS unit 244 may use "Assisted GPS" (A-GPS), satellite GPS, or any other suitable global positioning protocol or system that locates the position of the mobile device 212. For example, A-GPS utilizes terrestrial cell phone towers or Wi-Fi hotspots (e.g., wireless router points) to more accurately and more quickly determine location of the mobile device 212 while satellite GPS generally may be more useful in more remote regions that may lack cell towers or Wi-Fi hotspots. The communication unit or module 258 may communicate with the server 202 via any suitable wireless communication protocol network, such as a wireless telephony network (e.g., GSM, CDMA, LTE, etc.), a WLAN network (or other similar network according to 802.11 standards), a WiMAX network, a Bluetooth network, and/or others.

The image capture device 256 may be a built-in camera within the mobile device 212 or may be an external camera, such as a webcam, that is communicatively coupled with the mobile device 212 (or any other internet-enabled device 206-216). The user-input device or generally a user interface (not shown) may include a "soft" keyboard that is displayed on the display 240 of the mobile device 212, an external hardware keyboard communicating via a wired or a wireless connection (e.g., a Bluetooth keyboard), an external mouse, or any other suitable user-input device. The user interface (which may include the display 240) may be configured to present information to the user and/or receive inputs from the user, and may accordingly include a set of I/O components (e.g., capacitive or resistive touch sensitive input panels, keys, buttons, lights, LEDs, cursor control devices, haptic devices, and others). In embodiments, the display 240 may be a touchscreen display using singular or combinations of display technologies and can include a thin, transparent touch sensor component superimposed upon a display section that is viewable by a user. For example, such displays include capacitive displays, resistive displays, surface acoustic wave (SAW) displays, optical imaging displays, and the like.

As discussed with reference to the controllers 155 and 224, it should be appreciated that although FIG. 1D depicts only one microprocessor 248, the controller 242 may include multiple microprocessors 248. Similarly, the memory of the controller 242 may include multiple RAMs 250 and multiple program memories 246. Although the FIG. 1D depicts the I/O circuit 254 as a single block, the I/O circuit 254 may include a number of different types of I/O circuits. The controller 242 may implement the RAM(s) 250 and the program memories 246 as semiconductor memories, magnetically readable memories, and/or optically readable memories, for example.

The one or more processors 248 may be adapted and configured to execute any one or more of the plurality of software applications 264 and/or any one or more of the plurality of software routines 268 residing in the program memory 242, in addition to other software applications. One of the plurality of applications 264 may be a client application 266 that may be implemented as a series of machine-readable instructions for performing the various tasks associated with receiving information at, displaying information on, and transmitting information from the mobile device 212. One of the plurality of applications 264 may be a native web browser 270, such as, for example, Apple's Safari®, Google Android™ mobile web browser, Microsoft Internet Explorer® for Mobile, Opera Mobile™, that may be implemented as a series of machine-readable instructions for receiving, interpreting, and displaying web page information from the server 202, the facility servers 126, or the server applications 113 while also receiving inputs from the user. Another application of the plurality of applications may include a location awareness application 276 that may be implemented as a series of machine-readable instructions for receiving, interpreting, and displaying location information of the mobile device 212 (or any other internet-enabled device 206-216) from the GPS unit 244. One of the plurality of routines may include an image capture routine 272 that coordinates with the image capture device 256 to retrieve image data for use with one or more of the plurality of applications, such as the client application 266, or for use with other routines. Another routine in the plurality of routines may include an image display routine 274 that receives and interprets image data of any type or format for display. Likewise, the image display routine 274 may coordinate with the image capture routine 272 to obtain image data and process the image data into a displayable format for use with the client application 266.

A customer or generally a user may launch the client application 266 from an internet-enabled device, such as one of the internet-enabled devices 206-216, to access the server 202 cooperating with the central processing system 140 and the retail network 110. Additionally, the customer or the user may also launch or instantiate any other suitable user interface application (e.g., the web browser 270, or any other one of the plurality of software applications 264) to access the server 202, the facility servers 126, or the server applications 113. Generally, the term "user" is used when referring to a person who is operating one of the internet-enabled devices 206-216 and is not exclusive of the term "customer." As described above, one or both of the databases 146 and 182, illustrated in FIGS. 1A and 1B, respectively, may include various information about the retail store's customers and the images printed by the retail store, as well as basic biographical information about the customer, such as a customer name, a customer address, a customer phone number, and the like. Customer records are among the exemplary data that the system 100 may store on the databases 146 and 182.

In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 248 (e.g., working in connection with the operating system 260) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others).

Referring to FIG. 2, depicted an example layout of an example retail store 212 (such as the retail store 112 as described with respect to FIG. 1A). In the example depicted in FIG. 2, the retail store 212 is a pharmacy that may include different departments or sections (as shown: photo, pharmacy, health, and food/drink); however it should be appreciated that other types of retail stores and general environments are envisioned. Each of the different departments or sections may include various components, devices, or the like. For example, as depicted in FIG. 2, the photo section may include one or more printers 289 that may be configured to print digital images.

Customers or users 280, 282 may enter the retail store, browse in the various departments or sections, and/or purchase any desired goods or services. Each of the customers 280, 282 may be equipped with a respective electronic device 281, 283 (such as one of the Internet-enabled devices 206-216 as described with respect to FIG. 1A). Each electronic device 281, 283 may be any type of portable electronic device, for example, a notebook computer, a mobile phone, a Personal Digital Assistant (PDA), a smart phone, a tablet computer, a multimedia player, an MP3 or MP4 player, a digital or analog broadcast receiver, a remote controller, or any other electronic apparatus.

According to embodiments, the retail store 212 may support various wireless local area network s (WLAN) and wireless personal area networks (WPAN) to which the electronic devices 281, 283 may connect. In one particular implementation, the retail store 212 may include one or more wireless access points (AP) 284 to which the electronic devices 281, 283 may connect via a WLAN connection. Accordingly, when the electronic devices 281, 283 are connected to the AP 284, the electronic devices 281, 283 may be connected to the local area network implemented within the retail store 212 (i.e., the retail store 212 may be an Internet "hotspot").

The retail store 212 may also be configured with a plurality of transmitters 285, 286, 287, 288 or "beacons" that may be disposed throughout the area of the retail store 212. Although FIG. 2 depicts the retail store 212 supporting four (4) transmitters 285-288, it should be appreciated that the retail store 212 may support fewer or additional transmitters. The plurality of transmitters 285-288 may be disposed in various locations of the retail store 212 (e.g., each department may include a single transmitter). Each of the plurality of transmitters 285-288 may be secured to various components of the retail store 212 (e.g., shelves, ceiling, etc.). Each of the plurality of transmitters 285-288 may include any combination of hardware and software components, including a module for transmitting or broadcasting signals. Further, each of the plurality of transmitters 285-288 may be configured to be powered by a battery or via another power source.

According to embodiments, each of the plurality of transmitters 285-288 may support one or more short-range communication protocols such as radio-frequency identification (RFID), Bluetooth®, Bluetooth® low energy (BLE), Infrared Data Association (IrDA), near field communication (NFC), ZigBee, other protocols defined under the IEEE 802 standard, and/or other technologies. Each of the plurality of transmitters 285-288 may also be configured to broadcast or transmit a signal that may include any stored data. In one embodiment, each of the plurality of transmitters 285-288 may continuously broadcast a signal that may include a unique identifier of the corresponding transmitter 285-288.

The signals that the transmitters 285-288 broadcast may have an associated detection range depending on the type of communication protocol. Generally, Bluetooth® signals have a range of 100 meters and BLE signals have a range of 50 meters. The detection range of the signal that the transmitters 285-288 broadcast may also vary and may be programmable. For example, the range of a first signal that is broadcast by the transmitter 285 may be fifteen (15) meters while the range of a second signal that is broadcast by the transmitter 286 may be twenty-five (25) meters.

When one of the electronic devices 281, 283 is within broadcast range of one of the transmitters 285-288, the electronic devices 281, 283 can detect and receive the signal. In particular, a communication module of the electronic devices 281, 283 that supports a short range communication protocol (e.g., a BLE chip) can detect and receive the signal. For example, FIG. 2 depicts the electronic device 281 detecting the signal broadcast by the transmitter 285.

According to embodiments, the electronic devices 281, 283 (and any application executing thereon) may facilitate various functionalities in response to detecting certain connections within the retail store 212. In particular, the electronic devices 281, 283 may detect one or more of the transmitters 285-288, and/or may connect to (or may detect the availability of) the access point 284, and may enable various functionalities based on the connections and/or the availabilities of the connections.

Figure 3:
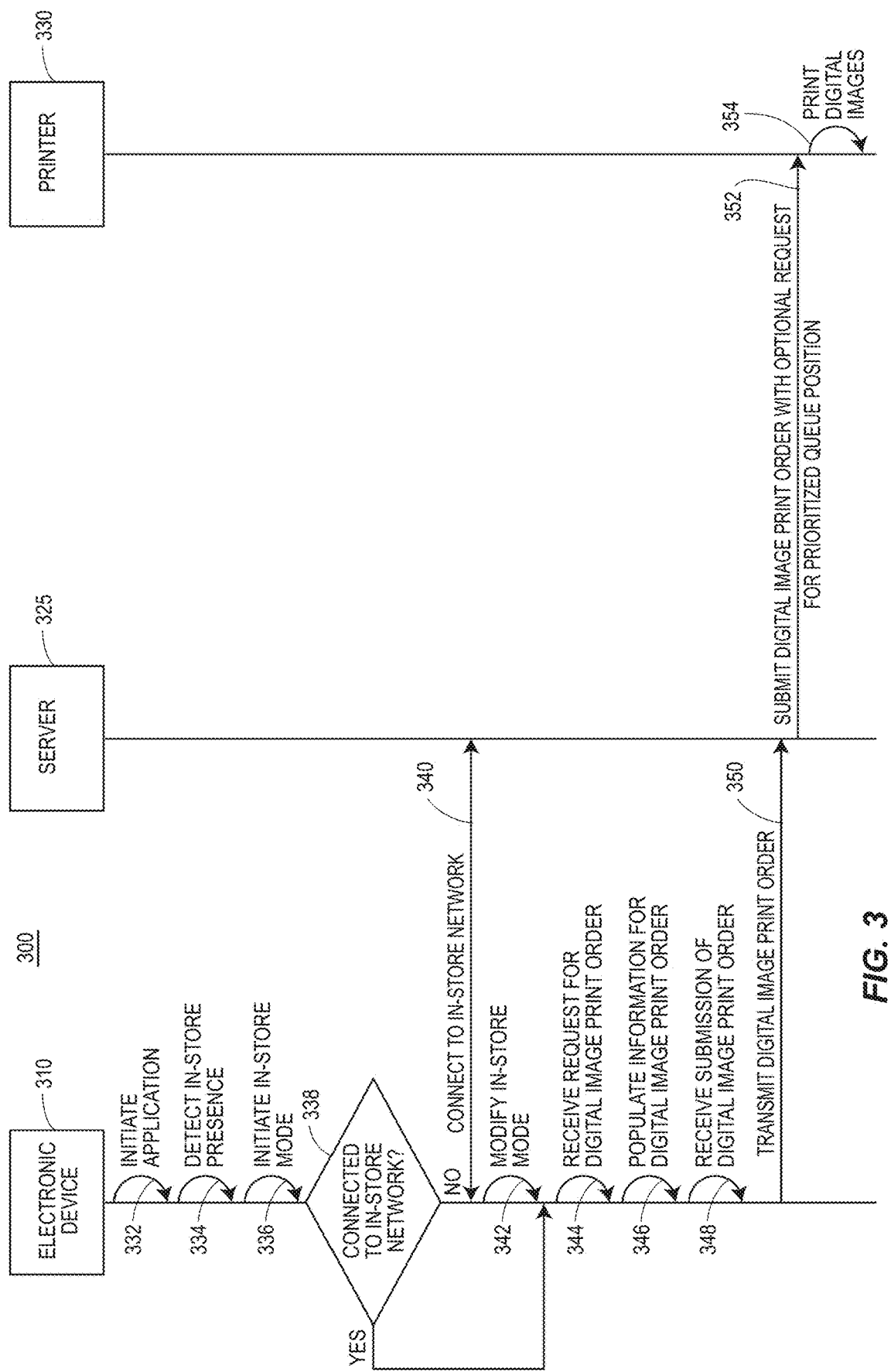
FIG. 3 is a signal diagram associated with facilitating enhanced device capability within a retail store, in accordance with some embodiments.

FIG. 3 depicts a signal diagram 300 associated with facilitating certain functionalities based on connections within a retail store. In particular, the signal diagram 300 depicts facilitating a print order for digital images. FIG. 3 includes an electronic device 310, a server 325, and a printer 330. Each of the server 325 and the printer 330 may be located within or associated with a retail store or similar environment. Further, a user may operate the electronic device 310 within the retail store or similar environment.

The signal diagram 300 may begin when the electronic device 310 initiates (332) an application stored thereon, where the application may be associated with the retail store or an associated retail chain. For example, if the retail store is a pharmacy, then the application may be offered by the associated pharmacy company. The application may enable the user to facilitate various operations and generally make selections through the electronic device 310, such as via a user interface of the electronic device 310. During operation of the application, the electronic device 310 may connect to, send data to, and receive data from, a back-end server that may be separate from the server 325, such as the server 202 as discussed with respect to FIG. 1A.

The application may support an "in-store mode" that may offer various in-store functionalities associated with the retail store, where the in-store functionalities may be tailored to the user's experience within the retail store. For example, various of the in-store functionalities may include a product locator, a product scanner, a weekly ad viewer, a coupon clipper, and a shopping list viewer. Before initiating the in-store mode, the electronic device 310 may detect (334) its presence within the retail store. According to embodiments, the electronic device 310 may detect in-store presence using a variety of techniques.

In one implementation, the electronic device 310 may identify its location (e.g., via a GPS module) and, using a geolocation technique, determine that it is located near or within the retail store. The electronic device 310 may retrieve any location data associated with the retail store from the back-end server associated with the application or may locally access the relevant location data, where the electronic device 310 may compare its location to the retrieved location of the retail store. The electronic device 310 may be configured to continuously monitor its location, and may automatically determine when it is located near or within the retail store.

In another implementation, the electronic device 310 may detect a signal from an in-store transmitter or "beacon" via a short-range communication, and may examine information retrieved from the in-store transmitter to determine that the electronic device 310 is located near or within the retail store. In a further implementation, the electronic device 310 may detect that a WLAN associated with the retail store is available, and thus that the electronic device 310 is located near or within to the retail store. In particular, the electronic device 310 may detect one or more available WLAN connections each having an associated service set identification (SSID) that identifies the corresponding network. It should be appreciated that additional techniques of detecting in-store presence are envisioned.

After detecting its in-store presence, the electronic device 310 may initiate (336) the in-store mode associated with the application, where the in-store mode may offer various functionalities that may be specific to the user's presence within the retail store. In one implementation, the electronic device 310 may automatically initiate the in-store mode in response to determining its in-store presence (e.g., in response to detecting the availability of an in-store WLAN). In another implementation, the electronic device 310 may prompt the user to select whether to enter the in-store mode.

After initiating the in-store mode and indicating the various available features or functionalities, the electronic device 310 may determine (338) whether it is connected to an in-store network. In one implementation, the in-store network may be a WLAN, and the electronic device 310 may connect to the WLAN via an access point, as described with respect to FIG. 2. In another implementation, the in-store network may be a file transfer protocol (FTP) connection. Generally, any compatible electronic device that is within (or in some cases, in proximity to) the retail store may connect to the WLAN. In some implementations, the electronic device may initiate the in-store mode in response to connecting to the in-store network.

If the electronic device 310 is connected to the in-store network ("YES"), processing may proceed to (344) or to other functionality. In contrast, if the electronic device 310 is not connected to the in-store network ("NO"), the electronic device may connect (340) to the in-store network, which effectively connects the electronic device 310 to the server 325. In an implementation, the electronic device 310 may automatically connect to the in-store network, such as if the electronic device 310 has stored the SSID of the in-store network. Further, multiple retail stores may maintain consistent SSIDs such that the electronic device 310 may automatically connect to the in-store network of any retail store in which it is located, even if the electronic device 310 has previously not connected to that in-store network.

After connecting to the in-store network, the electronic device 310 may modify (342) the in-store mode of the application to reflect the connection to the in-store network. According to embodiments, the modified in-store mode may offer additional, improved, enhanced, and/or otherwise modified functionalities. In one particular implementation, connection to the in-store network may increase the amount of digital images that the user may request to be printed, may increase the resolution quality of digital images that the user may request to be printed, and/or may enable other modifications. In modifying the in-store mode, the electronic device 310 may indicate, in the user interface, the modified functionality(ies). For example, the electronic device 310 may indicate, in the user interface, that the amount of digital images that the user may request to be printed has increased from ten (10) to thirty (30). For further example, the electronic device 310 may indicate, in the user interface, that the resolution quality of the digital images that the user may request to be printed has increased from 750×1334 pixels to 1080×1920 pixels.

In one particular implementation, at (344), the electronic device 310 may receive a request for a digital image print order. For example, the user may select a print selection displayed in the user interface as part of the modified in-store mode, where the print selection may indicate the increased capability resulting from the connection to the in-store network. In response to receiving the request, the electronic device may populate (346) information for the digital image print order. In one implementation, the electronic device may locate or identify any digital images recently captured by the electronic device 310, where the electronic device may locate or identify the maximum amount of recent digital images. In another implementation, the electronic device 310 may enable the user to select a set of digital images for printing.

Further, the electronic device 310 may populate the pick-up address for the print order as the address of the retail store in which the electronic device 310 is located, and may populate the personal information of the user (e.g., name, phone, email, payment information) using any registered information of the user that may be accessed by the application. Additionally, the electronic device 310 may identify or determine the aspect ratios of the identified or selected images and may designate an appropriate size(s) for the printed images. For example, the electronic device 310 may designate any images having a square aspect ratio as 4"×4" print images and may designate any images having a 3:2 aspect ratio as 4"×6" print images. Moreover, the electronic device 310 may calculate and display a total charge for the order based on the amount of images, the sizes of the images, the price for each image, and/or other factors.

The electronic device 310 may receive (block 348) a submission of the digital image print order. In particular, the user may select a corresponding submit selection that is displayed in the user interface of the electronic device 310. In an implementation, the electronic device 310 may also enable the user to agree to any terms and conditions and/or may enable the user to register for relevant communications (e.g., emails) associated with the retail store.

After the receiving the submission of the digital image print order, the electronic device 310 may transmit (350) the digital image print order and the populated information to the server 325 via the in-store network. The server 325 may submit (352) the digital image print order to the printer 330. In an optional implementation, the server 325 may also request a prioritized queue position for the digital image print order, whereby the printer 330 may prioritize the digital image print order over other print orders that are not submitted via the in-store network. After receiving the digital image print order, the printer 330 may print (354) the digital images according to the digital image print order. If the digital image print order is prioritized, the printer 330 may print the digital images before printing additional orders that may be in the print queue, even if those additional orders were submitted before the digital image print order.

The server 325 may also support local or push notifications related to the status of the digital image print order. For example, the server 325 may send push notifications to the application of the electronic device 310 indicating a place in the print queue, that the order is being printed, and/or that the photos are ready to be picked up by the user. It should be appreciated that other delivery methods for the notifications (e.g., text message, email) are envisioned.

FIGS. 4-10 depict example interfaces associated with the described embodiments. An electronic device (such as the electronic device 310 as described with respect to FIG. 3) may be configured to display the example interfaces via a user interface. In an implementation, the example interfaces may be associated with a dedicated application, for example an application offered for download by a retail chain. Each of the example interfaces may enable a user of the electronic device to make selections, input data or information, and generally facilitate operation of the functionalities indicated in the example interfaces. It should be appreciated that the graphical content of the example interfaces is exemplary, and that the example interfaces may include alternate, additional, and fewer graphical content.

Figure 4:
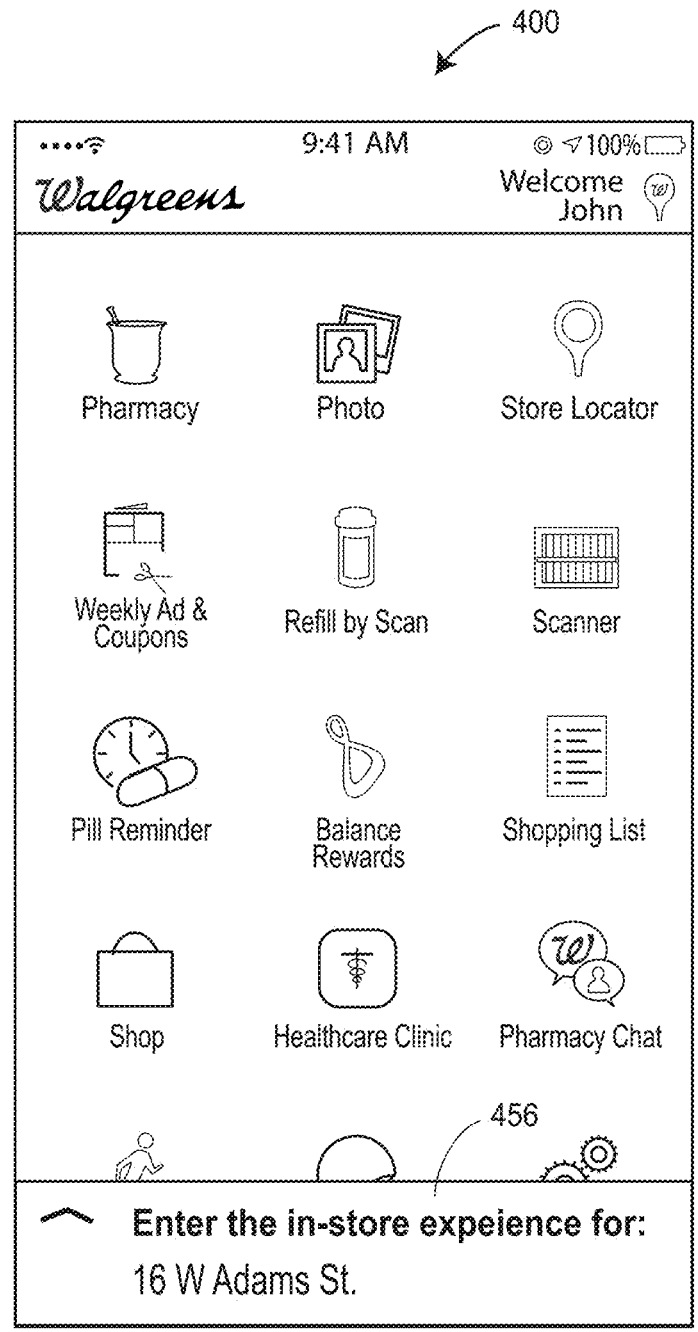
FIGS. 4-10 depict exemplary user interfaces associated with an application that supports enhanced device capability within a retail store, in accordance with some embodiments.

FIG. 4 depicts an example interface 400 that may be associated with a home screen of the application, which may be separate from an in-store mode of the application. The interface 400 may include a set of selections associated with various functionalities that may be supported by the application. The interface 400 may also include a banner 456 that indicates an availability of an in-store mode. The banner 456 may indicate the retail store with the available in-store mode (as shown: 16 W Adams St.). As discussed herein, the electronic device may detect availability of the in-store mode via various techniques, such as geolocation, detection of an in-store transmitter, detecting the availability of an in-store network, and/or other techniques. The user may select the banner 456 and, in response to detecting the selection, the electronic device may initiate the in-store mode. In some implementations, the electronic device may automatically initiate the in-store mode.

Figure 5:
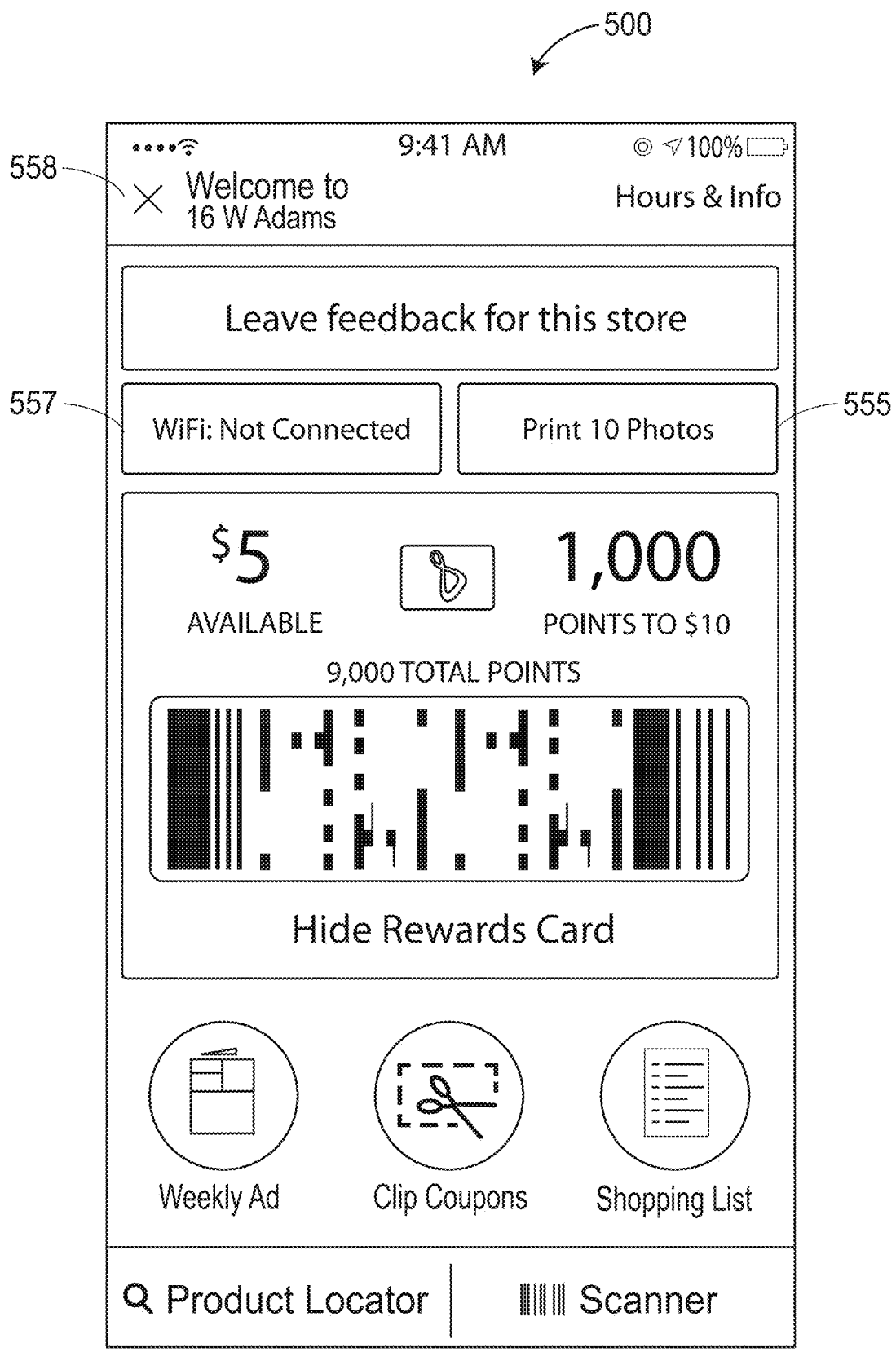

FIG. 5 depicts an example interface 500 associated with the in-store mode. The electronic device may display the interface 500 in response to detecting the selection of the banner 456 by the user. In some implementations, the electronic device may automatically initiate the in-store mode (and may accordingly automatically display the interface 500) in response to detecting the availability of the in-store mode. The interface 500 may indicate that the in-store is active via a banner 558 that may be located at the top of the interface 500. Further, the interface 500 may indicate various information associated with an account of the user such as, for example, an amount of available reward points or dollars. The interface 500 may further indicate various functionalities that may be selectable by the user such as, for example, a product locator, a product scanner, a weekly ad viewer, a coupon clipper, and a shopping list viewer.

Additionally, the interface 500 may indicate a network connection status 557 as well as a print capability 555. The network connection status 557 may indicate whether the electronic device is connected to the in-store network (as shown in FIG. 5: not connected). The print capability 555 may indicate an amount of digital images that the user is able to include in a digital image print order, based on the network connection status 557. As depicted in FIG. 5, because the electronic device is not connected to the in-store network, the amount of digital images indicated in the print capability 555 is ten (10) images.

Figure 6:
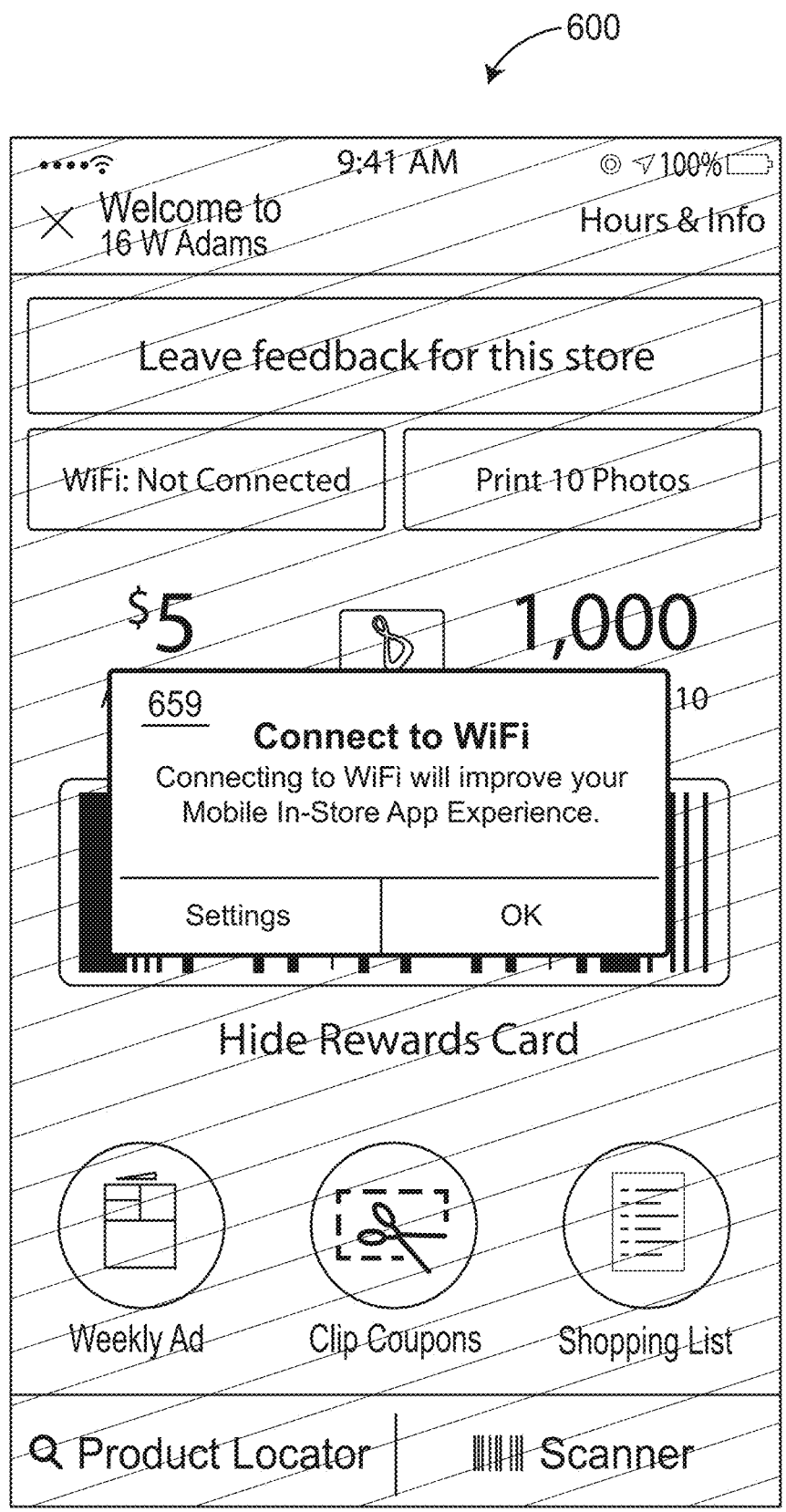

FIG. 6 depicts an example interface 600 indicating the availability of the in-store network. In particular, the interface 600 includes a window 659 indicating that connecting to the in-store network may improve the user experience, along with a selection to initiate connecting the electronic device to the in-store network. In one implementation, selecting "OK" in the window 659 may cause the electronic device to enable the user to turn on Wi-Fi capability, after which the electronic device may connect to the in-store network (either automatically or enabling the user to manually connect). In some implementations, the electronic device may automatically detect the availability of the in-store network without displaying the window 659 (such as if Wi-Fi is already enabled), and may connect to the in-store network (either automatically or enabling the user to manually connect).

Figure 7:
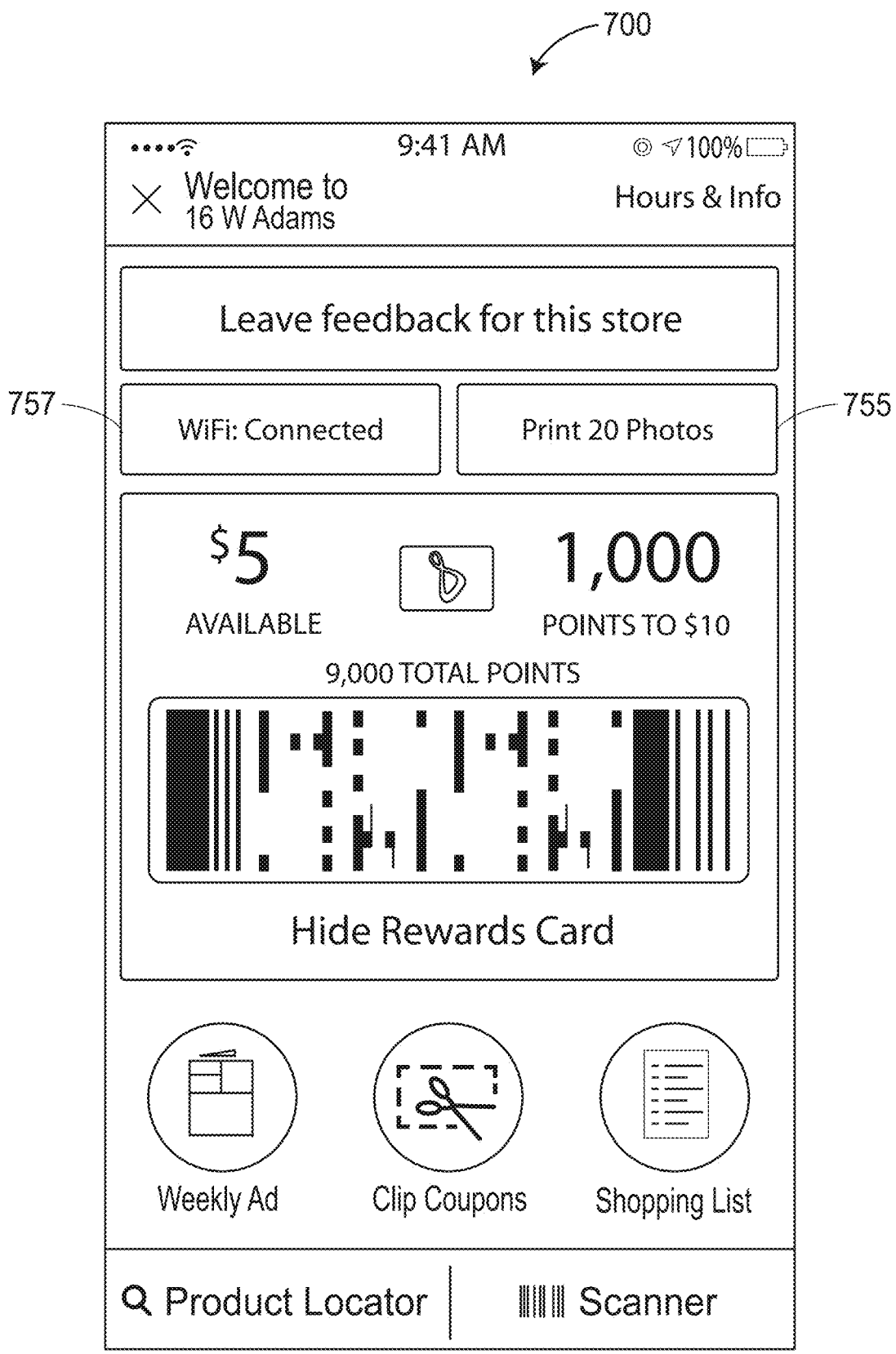

FIG. 7 depicts an example interface 700 that the electronic device may display after connecting to the in-store network. Accordingly, the interface 700 may include a network connection status 757 that indicates that the electronic device is connected to the in-store network. Additionally, the interface 700 may include a print capability 755 that indicates a modified amount of digital images that the user is able to include in a digital image print order. In particular, the print capability 755 indicates that the amount of digital images that the user is able to include in a digital image print order has increased from ten (10) to twenty (20). The user may initiate a digital image print order by selecting the print capability 755.

Figure 8:
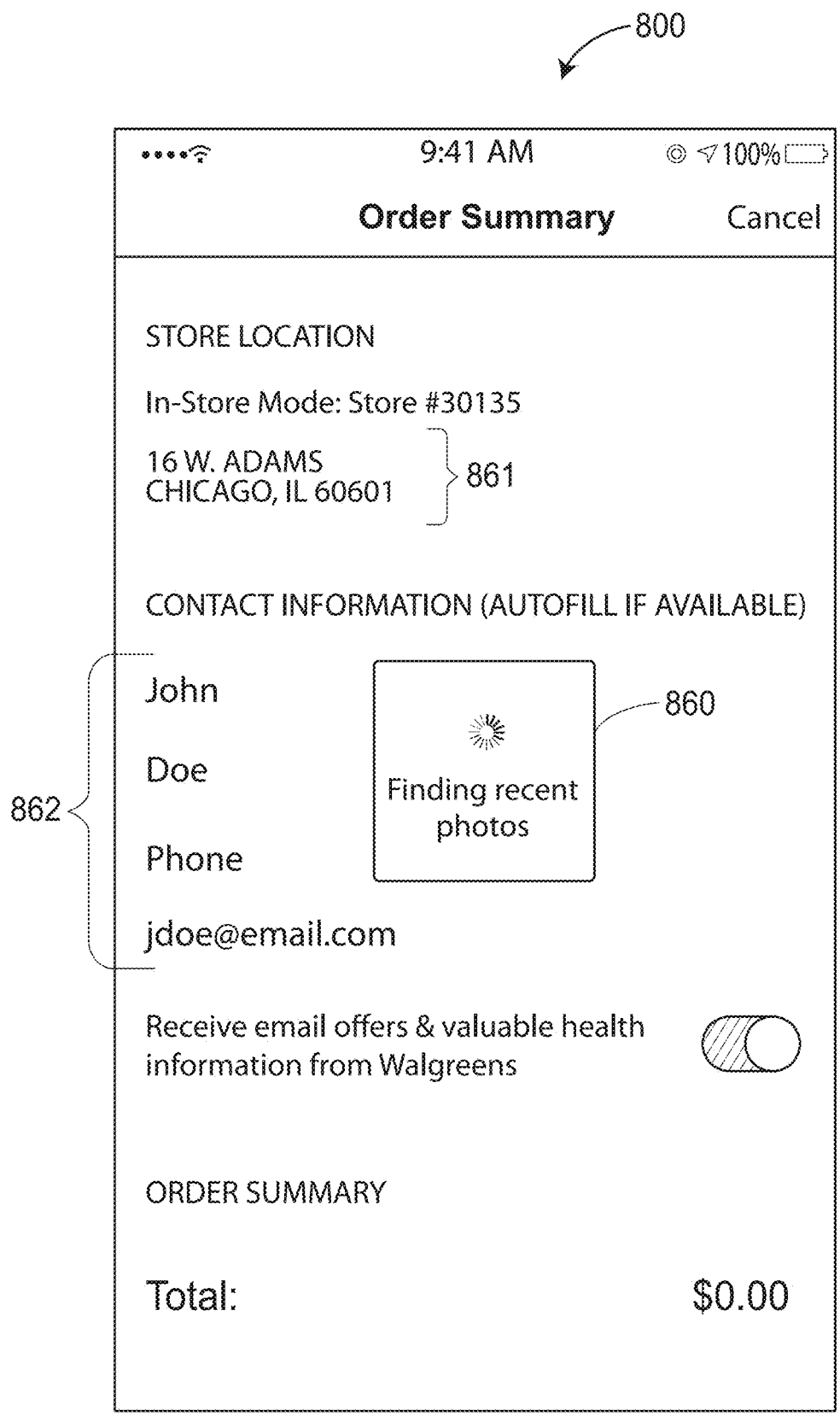

FIG. 8 depicts an example interface 800 that the electronic device may display in response to initiating a digital image print order (e.g., in response to the user selecting the print capability 755 of the interface 700). The interface 800 may be in the form of a summary of the digital image print order and may indicate any relevant information associated with the order. In particular, the interface 800 may indicate an address 861 of the retail store in which the electronic device is located (i.e., the retail store having the in-store network to which the electronic device is connected). The interface 800 may further indicate a set of contact information of the user who initiated the digital image print order. In an implementation, the electronic device may locate or identify any recently-captured digital images to add to the order, as indicated by a window 860 of the interface 800. In particular, because the print capability 755 indicates twenty (20) digital images, the electronic device may identify twenty (20) recently-captured images to add to the order. It should be appreciated that the electronic device may enable the user to select which digital images to add to the digital image print order.

Figure 9:
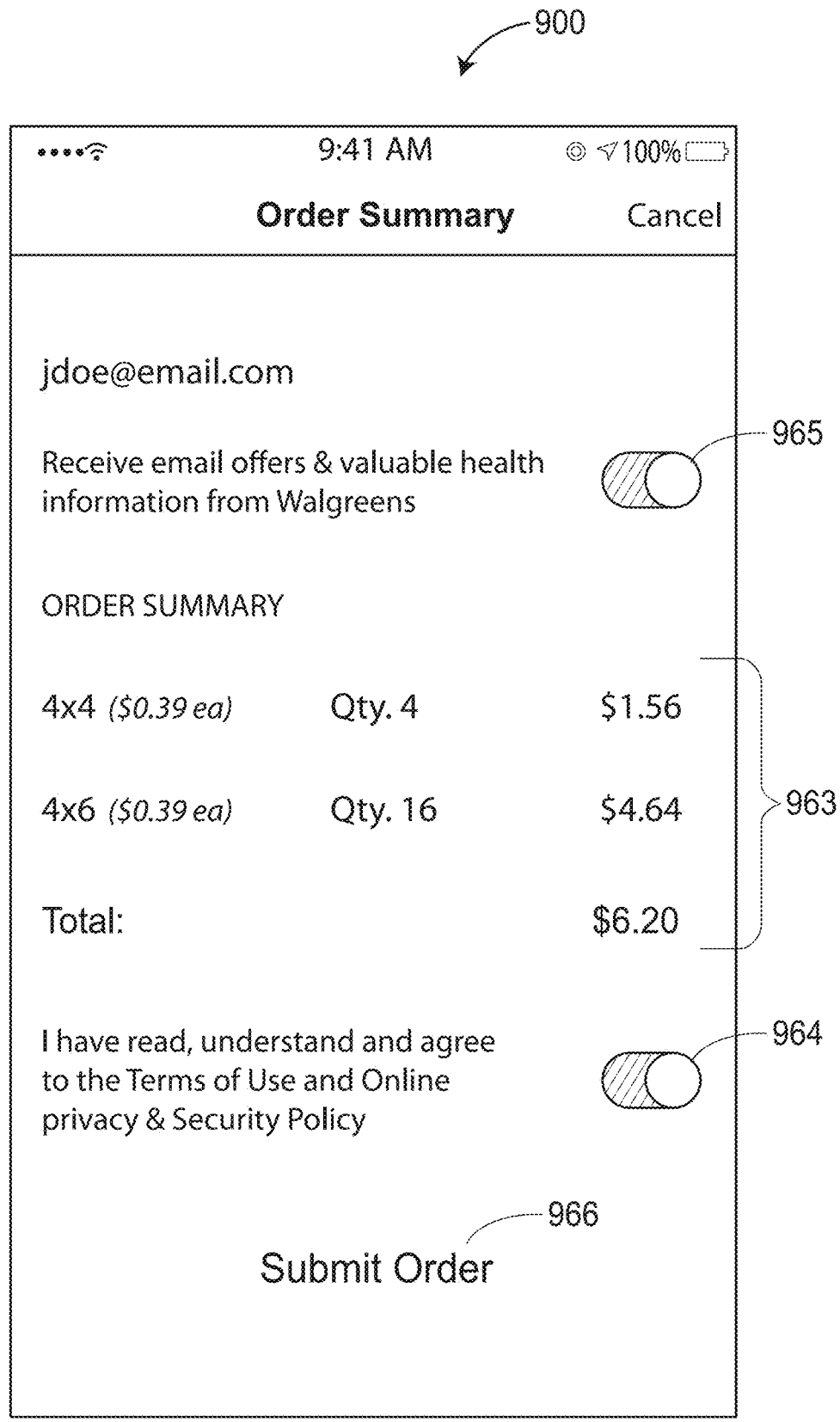

FIG. 9 depicts an example interface 900 that the electronic device may display after identifying the digital images to add to the digital image print order (or after the user has selected the digital images to add). The interface 900 includes an order summary 963 that may indicate a quantity of digital images, a size of the prints for the digital images, and a dollar amount for the digital image print order. As discussed herein, the electronic device may designate the different print sizes based on the respective aspect ratios of the digital images added to the order, or based on other properties. The interface 900 may further include an option 965 that may enable the user to select to receive digital communications (e.g., emails). Further, the interface 900 may include an option 964 that may enable the user to agree to any terms and conditions.

Figure 10:

The interface 900 may additionally include a submit selection 966 that, upon selection by the user, may cause the electronic device to submit the digital image print order for printing according to the order information. FIG. 10 depicts an example interface 1000 that may indicate, via a window 1067, that the electronic device has submitted the digital image print order, such as to a server of the retail store via the in-store network. In operation, the server may cause one or more printers that may be located within the retail store to print the digital images according to the digital image print order. In an implementation, the server may cause the one or more printers to prioritize the submitted digital image print order. Accordingly, the user may be able to pick up the printed images without having to leave the retail store.

Figure 11:
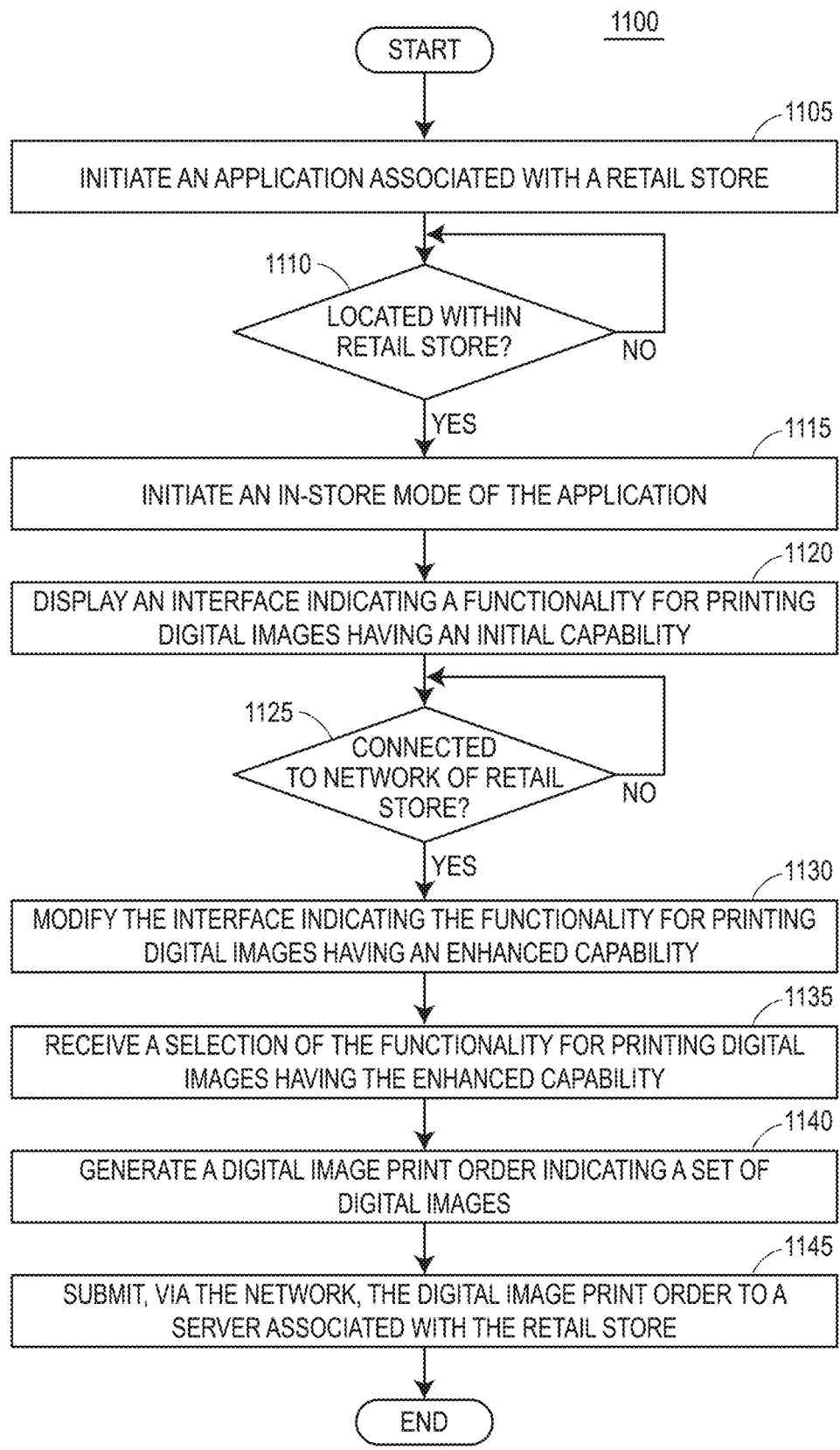
FIG. 11 depicts a flowchart of a method for enhancing an in-store experience within a retail store, in accordance with some embodiments.

FIG. 11 is a flow chart of an example method 1100 of enhancing an in-store experience within a retail store. The method 1100 may be performed by an electronic device that supports an application associated with the retail store. It should be appreciated that the method 1100 is merely exemplary and may include alternative or additional functionalities.

The method 1100 may begin when the electronic device initiates (block 1105) the application associated with the retail store. In embodiments, a user of the electronic device may select to initiate the application. The electronic device may determine (block 1110) whether it is located within the retail store. The electronic device may detect an in-store location according to a variety of techniques, including geolocating, detecting an available in-store network, receiving a communication from an in-store transmitter, or others.

If the electronic device is not located within the retail store ("NO"), processing may return to block 1110 or proceed to other functionality. If the electronic device is located within the retail store ("YES"), the electronic device may initiate (block 1115) an in-store mode of the application. According to embodiments, the in-store mode may offer various functionalities that may supplement or help the user with shopping for goods and services or generally navigating the retail store. One of the functionalities may be enabling the user to submit a digital image print order for a set of digital images to be printed within the retail store. Accordingly, the electronic device may display (block 1120) an interface indicating a functionality for printing digital images having an initial capability. In one scenario, the initial capability may correspond to an initial allowable amount of digital images to include in the digital image print order. It should be appreciated that other capabilities associated with the functionality for printing digital images are envisioned.

The electronic device may determine (block 1125) whether it is connected to a network of the retail store. In particular, the network may be a WLAN, and the electronic device may automatically connect to the network or the user may manually cause the electronic device to connect to the network. If the electronic device is not connected to the network ("NO"), processing may return to block 1125 or proceed to other functionality. If the electronic device is connected to the network ("YES"), the electronic device may modify (block 1130) the interface indicating the functionality for printing digital images having an enhanced capability. According to the scenario described above, the enhanced capability may correspond to an increased allowable amount of digital images to include in the digital image print order, where the increased allowable amount is greater than the initial allowable amount. It should be appreciated that other enhanced capabilities associated with the functionality for printing digital images are envisioned.

The electronic device may receive (block 1135) a selection of the functionality for printing digital images having the enhanced capability. In particular, the user may make the selection via a user interface. In response to receiving the selection, the electronic device may generate (block 1140) a digital image print order indicating a set of digital images. The electronic device may enable the user to select the set of digital images or the electronic device may identify any recently-captured images, where the amount of digital images in the set of digital images may reflect the enhanced capability of the functionality for printing digital images. In some implementations, the electronic device may generate the digital image print order by automatically populating information including an address of the retail store, user information associated with the user, image print sizes according to aspect ratios of the set of digital images, and/or other information.

The electronic device may submit (block 1145), via the network, the digital image print order to a server associated with the retail store. According to embodiments, the server may communicate with one or more printers that may be configured to print the set of digital images according to the digital image print order. In one embodiment, the electronic device may request the server to prioritize a queue position of the digital image print order so that the one or more printers may prioritize the printing of the set of digital images over other print orders that were not submitted via the in-store network.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

What is claimed is:

1. A computer-implemented method in an electronic device of enhancing an in-store experience within a retail store, the method comprising:
    initiating, on the electronic device by a processor, an application associated with the retail store and configured to facilitate a digital image print order;
    displaying, via a user interface, an interface associated with an in-store mode of the application, the interface indicating a functionality associated with the digital image print order;
    detecting that the electronic device connects to a network associated with the retail store; and
    in response to detecting that the electronic device connects to the network, submitting, via the network, the digital image print order to a server to facilitate printing of a set of digital images associated with the digital image print order by at least one printer located within the retail store, including requesting the server to prioritize a position of the digital image print order in a queue such that the at least one printer prioritizes printing the set of digital images over at least one other digital image print order that was not submitted via the network, wherein the server sends, to the electronic device, a notification indicating the position of the digital image print order in the queue.

2. The computer-implemented method of claim 1, wherein displaying the interface comprises:
    displaying, via the user interface, the interface associated with the in-store mode of the application, the interface indicating the functionality having an initial capability.

3. The computer-implemented method of claim 2, further comprising:
    in response to detecting that the electronic device connects to the network, modifying the interface to indicate an enhanced capability of the functionality.

4. The computer-implemented method of claim 1, wherein submitting, via the network, the digital image print order to the server comprises:
    submitting, via the network, the digital image print order to the server located within the retail store.

5. The computer-implemented method of claim 1, wherein displaying the interface associated with the in-store mode comprises:
    detecting that the electronic device is located within the retail store; and
    displaying the interface associated with the in-store mode in response to detecting that the electronic device is located within the retail store.

6. The computer-implemented method of claim 5, wherein detecting that the electronic device is located within the retail store comprises:
    identifying a location of the electronic device; and
    determining, based on the location, that the electronic device is located within the retail store.

7. The computer-implemented method of claim 5, wherein detecting that the electronic device is located within the retail store comprises:
receiving a signal from a transmitter located within the retail store.

8. The computer-implemented method of claim 1, wherein detecting that the electronic device connects to the network associated with the retail store comprises:
detecting that a wireless local area network (WLAN) connection capability of the electronic device has been enabled; and
automatically connecting to the network in response to detecting that the WLAN connection capability has been enabled.

9. The computer-implemented method of claim 1, wherein the at least one printer prints the set of digital images prior to printing another set of digital images associated with the at least one other digital image print order that was not submitted via the network.

10. An electronic device comprising:
a transceiver configured to connect to a network associated with a retail store;
a user interface configured to display content;
a memory storing a set of computer-executable instructions; and
a processor interfacing with the communication module, the user interface, and the memory, and configured to execute the set of computer-executable instructions to cause the processor to:
initiate an application associated with the retail store and configured to facilitate a digital image print order,
cause the user interface to display an interface associated with an in-store mode of the application, the interface indicating a functionality associated with the digital image print order,
detect that the electronic device connects, via the transceiver, to the network associated with the retail store, and
in response to detecting that the electronic device connects to the network, transmit, via the transceiver connected to the network, the digital image print order to a server to facilitate printing of a set of digital images associated with the digital image print order by at least one printer located within the retail store, including requesting the server to prioritize a position of the digital image print order in a queue such that the at least one printer prioritizes printing the set of digital images over at least one other digital image print order that was not submitted via the network, wherein the server sends, to the electronic device, a notification indicating the position of the digital image print order in the queue.

11. The electronic device of claim 10, wherein the processor causes the interface to indicate the functionality having an initial capability.

12. The electronic device of claim 11, wherein the processor is further configured to:
in response to detecting that the electronic device connects to the network, cause the user interface to modify the interface to indicate an enhanced capability of the functionality.

13. The electronic device of claim 10, wherein the server is located within the retail store.

14. The electronic device of claim 10, wherein processor is further configured to detect that the electronic device is located within the retail store;
and wherein the processor causes the user interface to display the interface associated with the in-store mode in response to detecting that the electronic device is located within the retail store.

15. The electronic device of claim 14, wherein to detect that the electronic device is located within the retail store, the processor is configured to:
identify a location of the electronic device, and
determine, based on the location, that the electronic device is located within the retail store.

16. The electronic device of claim 14, wherein the processor detects that the electronic device is located within the retail store by receiving a signal from a transmitter located within the retail store.

17. The electronic device of claim 10, wherein to detect that the electronic device connects to the network associated with the retail store, the processor is configured to:
detect that a wireless local area network (WLAN) connection capability of the electronic device has been enabled, and
automatically connect to the network in response to detecting that the WLAN connection capability has been enabled.

18. The electronic device of claim 10, wherein the at least one printer prints the set of digital images prior to printing another set of digital images associated with the at least one other digital image print order that was not submitted via the network.

* * * * *